(12) United States Patent
Natsui

(10) Patent No.: US 7,884,857 B2
(45) Date of Patent: Feb. 8, 2011

(54) IMAGE PICKUP APPARATUS, IMAGE SIGNAL PROCESSING APPARATUS, AND IMAGE SIGNAL PROCESSING METHOD WHICH SUPPRESS FALSE OUTLINES

(75) Inventor: Tomoyoshi Natsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 394 days.

(21) Appl. No.: 12/055,451

(22) Filed: Mar. 26, 2008

(65) Prior Publication Data

US 2008/0239101 A1    Oct. 2, 2008

(30) Foreign Application Priority Data

Mar. 28, 2007    (JP)    ............................ P2007-085307

(51) Int. Cl.
   *H04N 5/228*    (2006.01)
   *H04N 9/68*    (2006.01)
(52) U.S. Cl. .................................... 348/222.1; 348/234
(58) Field of Classification Search ............... 348/222.1
   See application file for complete search history.

(56) References Cited

U.S. PATENT DOCUMENTS 5,194,960 A * 3/1993 Ota ............................ 348/362
6,002,796 A * 12/1999 Kawa et al. ................. 382/168
6,111,607 A *  8/2000 Kameyama ................. 348/256
6,141,047 A * 10/2000 Kawai et al. ................ 348/254
2008/0043262 A1 * 2/2008 Ovsiannikov ............... 358/1.9
2010/0045824 A1 * 2/2010 Kido et al. .................. 348/234

FOREIGN PATENT DOCUMENTS

JP    8 181887    7/1996

* cited by examiner

*Primary Examiner*—Ngoc-Yen T Vu
(74) *Attorney, Agent, or Firm*—Frommer Lawrence & Haug LLP; William S. Frommer; Ellen Marcie Emas

(57) ABSTRACT

A histogram detecting unit detects a distribution of numbers of pixels by luminance level of a picked-up image signal. A maximum luminance value calculating unit calculates a maximum luminance value of the inputted image signal. A high luminance proportion calculating unit calculates a proportion of a high luminance signal out of all of the pixels composing one or a plurality of frames based on the detected distribution of numbers of pixels by luminance level. A knee point calculating unit calculates a knee point based on the calculated maximum luminance value and proportion of the high luminance signal. A knee processing unit generates a knee slope with a predetermined inclination starting at the calculated knee point. The knee processing unit does not change the value of the predetermined inclination, regardless of the value of the calculated knee point.

6 Claims, 11 Drawing Sheets

IMAGE PICKUP APPARATUS, IMAGE SIGNAL PROCESSING APPARATUS, AND IMAGE SIGNAL PROCESSING METHOD WHICH SUPPRESS FALSE OUTLINES

CROSS REFERENCES TO RELATED APPLICATIONS

The present invention contains subject matter related to Japanese Patent Application JP 2007-085307 filed in the Japanese Patent Office on Mar. 28, 2007, the entire contents of which being incorporated herein by reference.

BACKGROUND OF THE INVENTION

1. Field of the Invention

The invention relates to an image pickup apparatus that can be suitably applied to a video camera or the like with an automatic knee processing function, for example, and also relates to an image signal processing apparatus and an image signal processing method used by such apparatuses.

2. Description of the Related Art

CCD (Charge Coupled Device) elements and CMOS (Complementary Metal Oxide Semiconductor) elements are currently in widespread use as image pickup elements in image pickup apparatuses such as digital still cameras and video cameras. However, since the output dynamic range of such image pickup elements is narrower than the input dynamic range, there is the problem that when the inputted amount of light exceeds the output dynamic range, so-called "bright-area-gradation deterioration" occur in images displayed on a display unit or the like.

FIG. 1 is a graph showing the output characteristics of an image signal outputted from an image pickup element. In FIG. 1, the horizontal axis shows the input dynamic range (%) and the vertical axis shows the output dynamic range (%). In FIG. 1, the maximum value in the output dynamic range (hereinafter referred to as the "white clip point") is shown by the broken line labeled "WP". In the example shown in FIG. 1, the white clip point WP is 109%, and the input dynamic range and the output dynamic range match each other one to one until 109% is reached. That is, an output signal that is in proportion to the inputted amount of light is outputted.

However, once the inputted amount of light exceeds the white clip point WP, the value of the output dynamic range no longer changes. That is, even if an amount of light that exceeds the white clip point WP is received, only a fixed value will be outputted from the image pickup element. This means that high luminance components where the white clip point WP is exceeded will be deteriorated in bright-area-gradation (so that highlights portions appear pure white) when displayed on a monitor or the like.

In the past, to suppress bright-area-gradation deterioration, processing has been carried out to compress high luminance components of a predetermined level or higher to keep the brightness (i.e., luminance) of the subject within the output dynamic range. Such processing is called "knee processing". FIG. 2 shows the image signal output characteristics when knee processing has been carried out. In FIG. 2, the point labeled KP shows the start point for the knee processing and is called the "knee point". In the example shown in FIG. 2, the knee point KP is at the point of 88% of the input dynamic range, and high luminance components in a range of 88% to 160% of the input dynamic range are compressed to within 88% to 109% of the output dynamic range. The output characteristics curve of the image signal is bent on reaching the knee point KP, and the slope (i.e., inclination) of the curve corresponds to the amount of compression in each range of the input dynamic range where knee processing has been carried out. This slope is called the "knee slope".

FIG. 3 is a histogram showing a distribution of numbers of pixels by luminance level in a state where knee processing has not been carried out, and FIG. 4 is a histogram showing a distribution of numbers of pixels by luminance level in a state where knee processing has been carried out on an image signal composed of the pixels shown in FIG. 3. In these histograms, the vertical axis shows the number of pixels and the horizontal axis shows luminance levels (%). In FIG. 3, since knee processing is not carried out, all of the pixels to the right of the line at the white clip point WP are displayed on a display with bright-area-gradation deteriorated.

On the other hand, FIG. 4 shows that by carrying out processing that compresses the high-luminance components in the range from 88% (which is set as the knee point as shown in FIG. 2) to 160% of the input dynamic range into the range from 88% to 109% of the output dynamic range, the number of pixels with a luminance level of 150% or higher falls, and such pixels with the luminance level of 150% are replaced by pixels with a luminance level of 50 to 100% and pixels with a luminance level of 100 to 150%. By carrying out this processing, it is possible to reduce the total number of pixels with luminance values that are equal to or higher than the white clip point WP, so that it is possible to suppress bright-area-gradation deterioration.

FIG. 5A shows an example of an image where knee processing has not been carried out and FIG. 5B shows an example of an image produced by carrying out knee processing on the image shown in FIG. 5A. Although the part labeled as the region AR1 in FIG. 5A is deteriorated in bright-area-gradation, by carrying out knee processing to compress the high-luminance components, it is possible to correct the image to an image with suppressed bright-area-gradation deterioration, such as that shown in FIG. 5B. Also, image pickup apparatuses with a function for automatically adjusting the knee point in accordance with the luminance level of the subject have been introduced in recent years. Such function is called an "automatic knee" or "autoknee".

A method that assigns a wider output dynamic range to image levels that appear frequently in a frame is also conceivable. In such method, the inclination of the knee slope is automatically controlled.

Japanese Unexamined Patent Application Publication No. H08-181887 discloses adaptive control over the knee slope from the knee point upward in accordance with the histogram of the input image.

SUMMARY OF THE INVENTION

If a high luminance subject is present in the image being picked up, even when the proportion of a frame occupied by the high luminance subject is extremely small, the knee point will still be set based on the high luminance subject to compress the high luminance components in the input dynamic range to within the output dynamic range. That is, since the knee point will be greatly lowered, when such processing is carried out there is the problem of poor gradation in the entire image as shown in FIG. 6, resulting in an overall flat image. In FIG. 6, the gradation falls across the entire image due to the presence of a high luminance subject HB1 such as a point light source, resulting in the subject being reproduced not as a sphere but as a flat circle.

As methods for compressing the high luminance components in the input dynamic range into the output dynamic range, methods that change the inclination of the knee slope are also known (see the above-mentioned JP Publication for example). However, when such processing results in a large change in the inclination of the knee slope before and after the knee processing, the rate at which the gradation changes in the image will change very suddenly. For this reason, there are cases where outlines (i.e., false outlines) such as lines that resemble contours are produced in the periphery of edge portions of the image.

The invention was conceived in view of the above-described and other problems and addresses suppressing bright-area-gradation-deterioration produced when a high luminance subject is present and minimizing the production of false outlines.

According to an embodiment of the invention, an image pickup apparatus is provided. A histogram detecting unit detects a distribution of numbers of pixels by luminance level of a picked-up image signal. A maximum luminance value calculating unit calculates a maximum luminance value of the inputted image signal. A high luminance proportion calculating unit calculates a proportion of a high luminance signal out of all of the pixels composing one or a plurality of frames based on the distribution of numbers of pixels by luminance level detected by the histogram detecting unit. A knee point calculating unit calculates a knee point based on the maximum luminance value calculated by the maximum luminance value calculating unit and the proportion of the high luminance signal calculated by the high luminance proportion calculating unit. A knee processing unit generates a knee slope with a predetermined inclination starting at the knee point calculated by the knee point calculating unit. The knee processing unit does not change the value of the predetermined inclination, regardless of the value of the knee point calculated by the knee point calculating unit.

In this way, the knee point is calculated based not only on the maximum luminance value but also with consideration to the proportion of high luminance signals. Also, regardless of the level set as the knee point, a knee slope of the same inclination is generated.

According to the embodiment of the invention, since the knee point is calculated based not only on the maximum luminance value but also with consideration to the proportion of high-luminance signals, when a subject with an extremely high luminance level is present but the proportion of the pixels occupied by such subject is low, it is possible to set a suitable knee point that takes into account the distribution of luminance values.

Also, since the inclination of the knee slope is not changed according to the embodiment of the invention, it is possible to suppress generation of false outlines.

BRIEF DESCRIPTION OF THE DRAWINGS

FIG. 5A shows an image before knee processing and FIG. 5B shows the image after knee processing.

DESCRIPTION OF THE PREFERRED EMBODIMENTS

Figure 1:
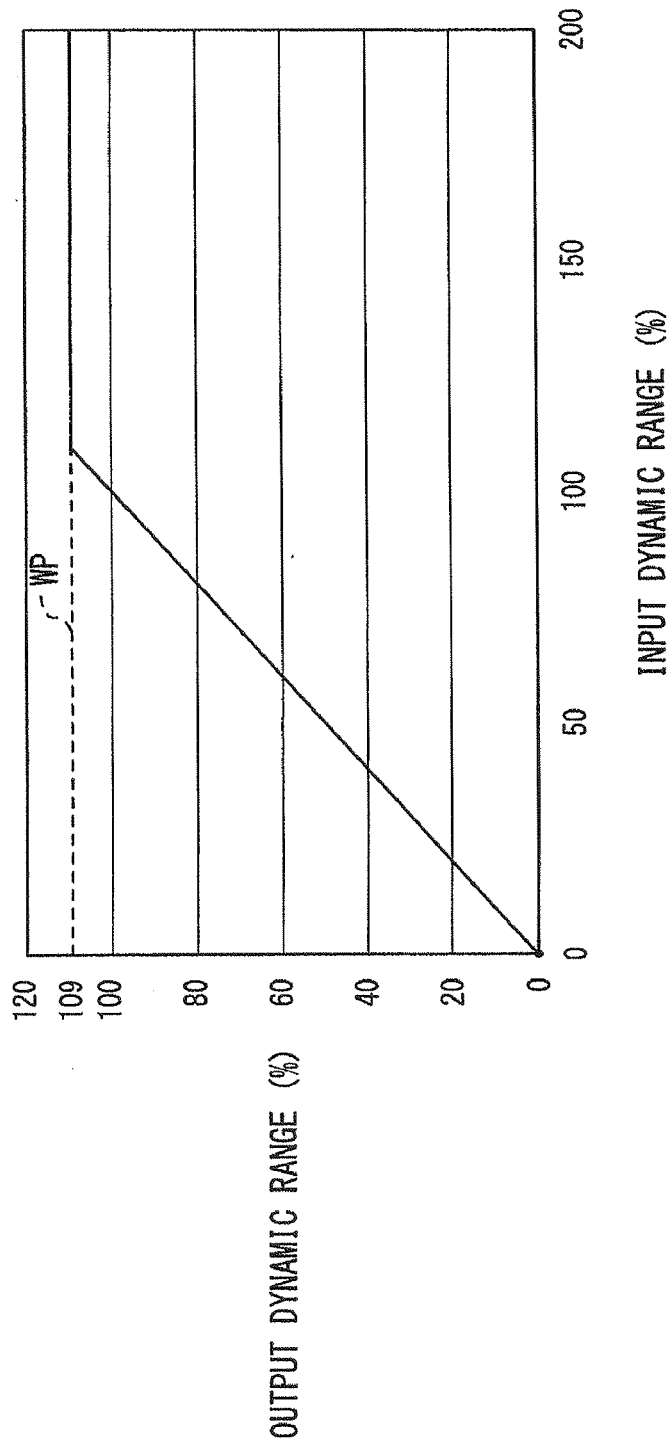
FIG. 1 is a characteristics graph showing the output characteristics of an existing image signal.
Figure 2:
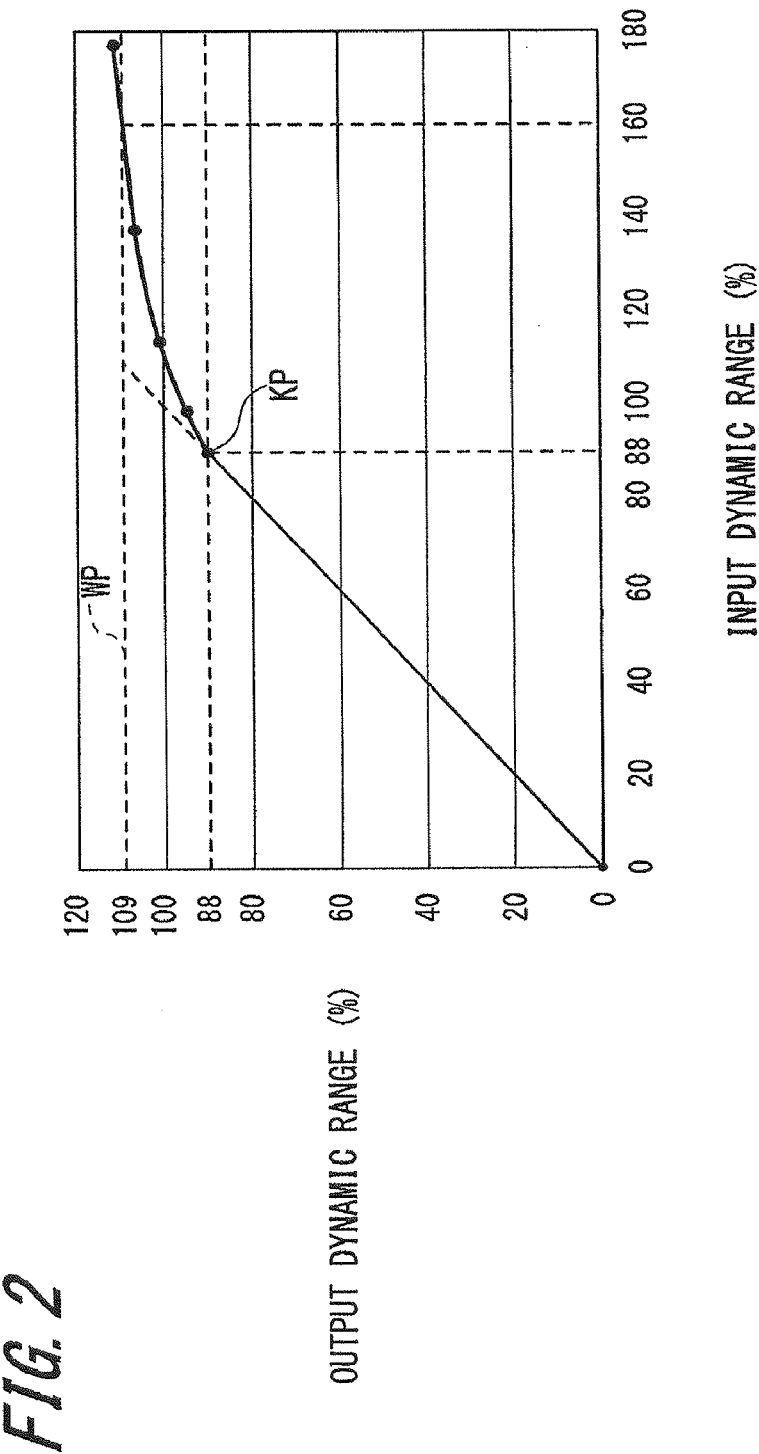
FIG. 2 is a characteristics graph showing the output characteristics of an existing image signal.
Figure 3:
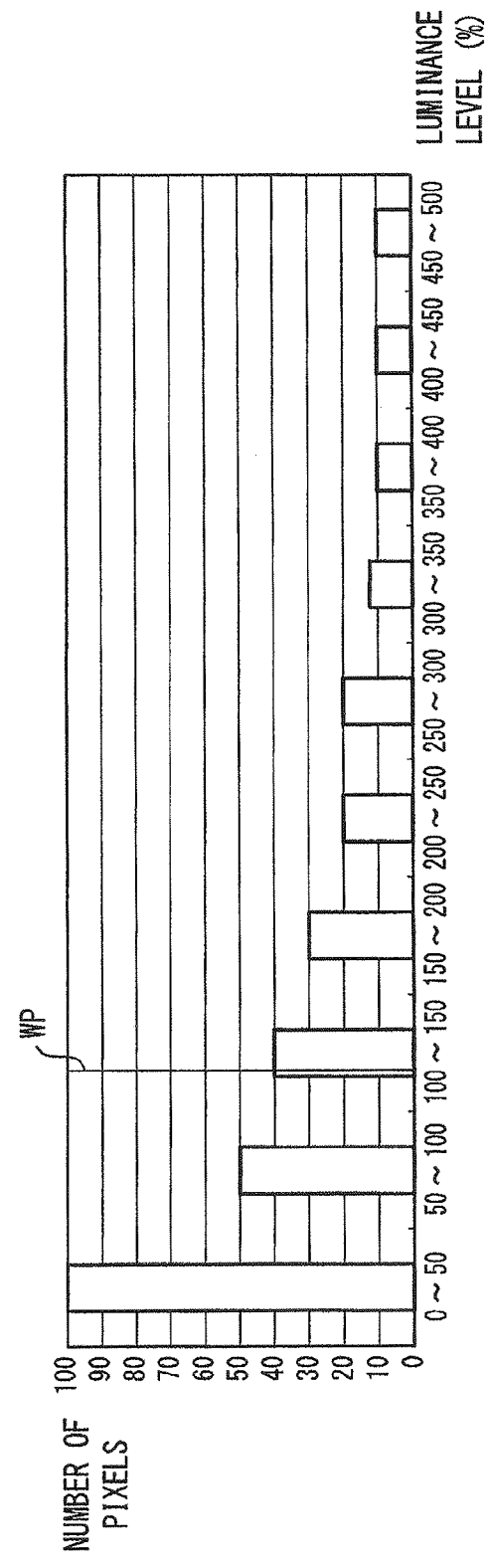
FIG. 3 is a histogram showing the distribution characteristics of numbers of pixels by luminance level before existing knee processing.
Figure 4:
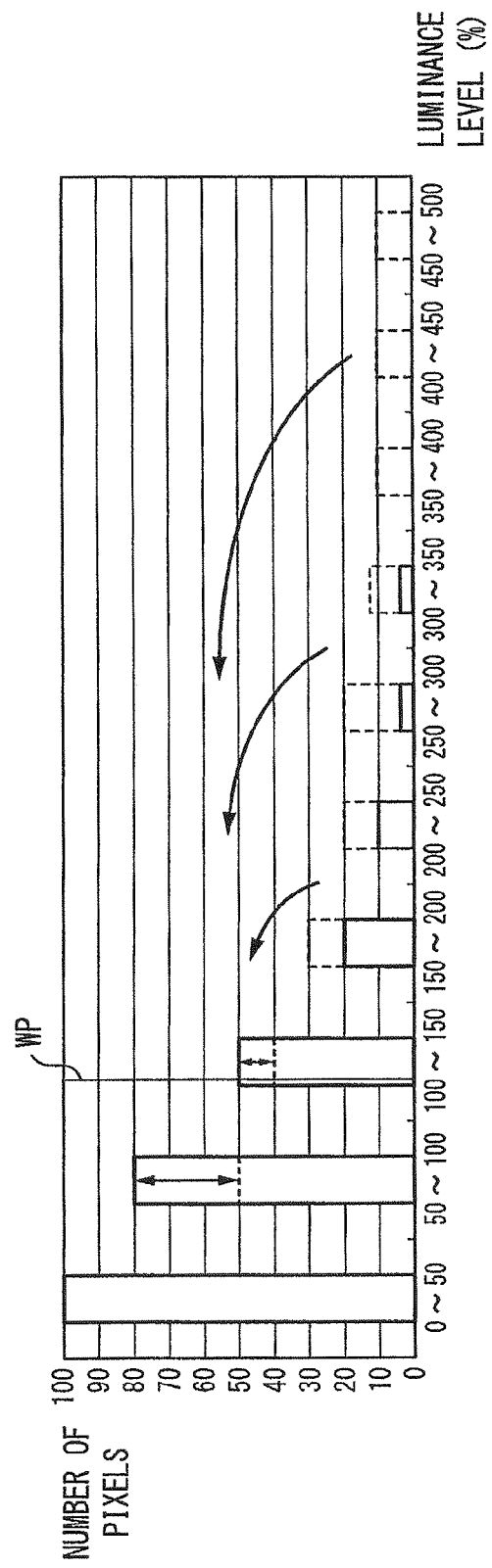
FIG. 4 is a histogram showing the distribution characteristics of numbers of pixels by luminance level after existing knee processing.
Figure 5B:
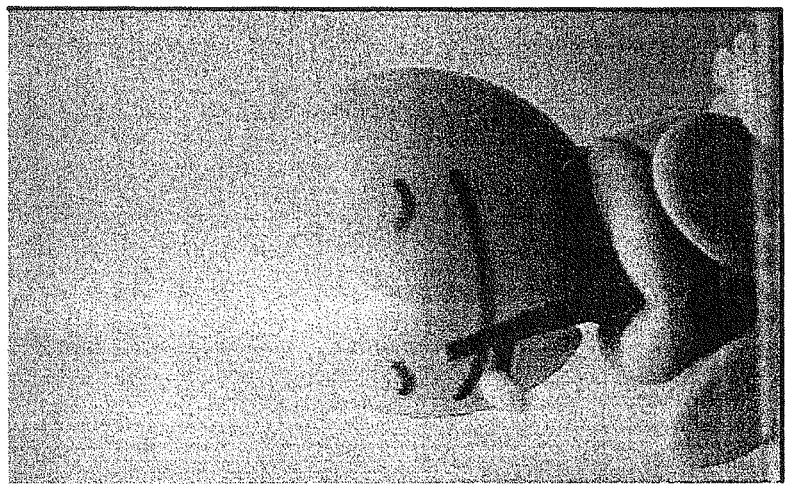
FIGS. 5A and 5B are examples of images for explaining an existing picked-up image, where
Figure 5A:
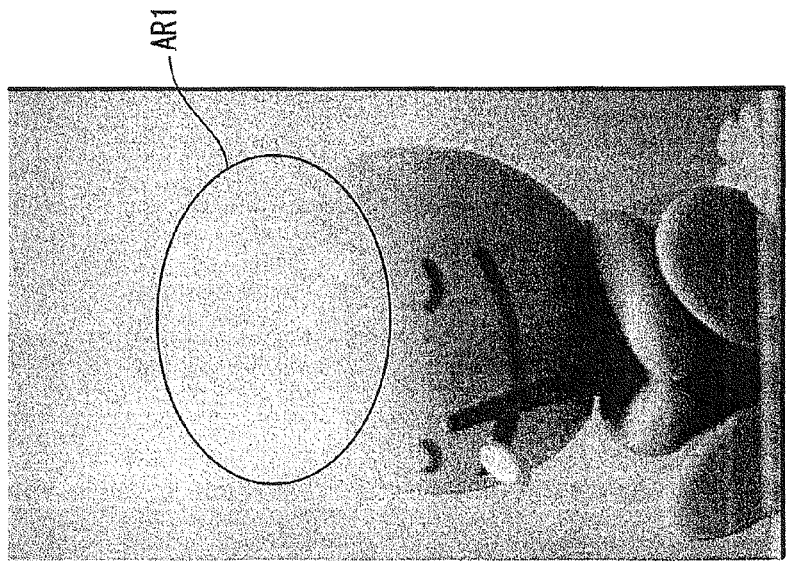
Figure 6:
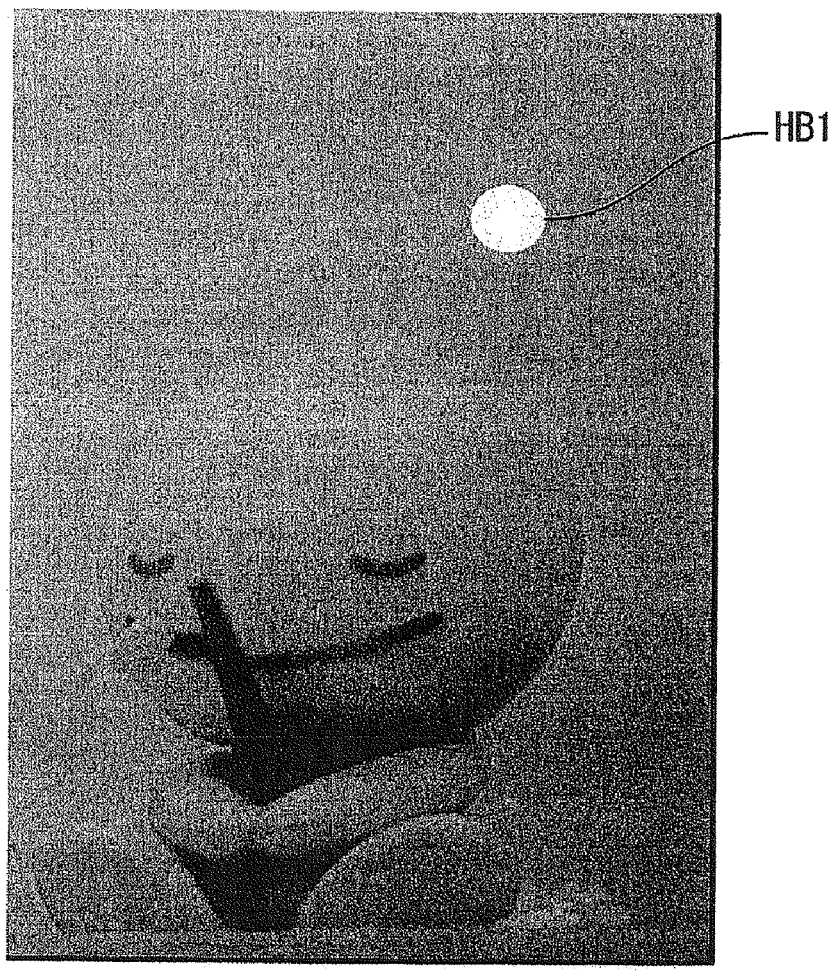
FIG. 6 is an exemplary image for explaining an existing picked-up image when a high-luminance subject is present.
Figure 7:
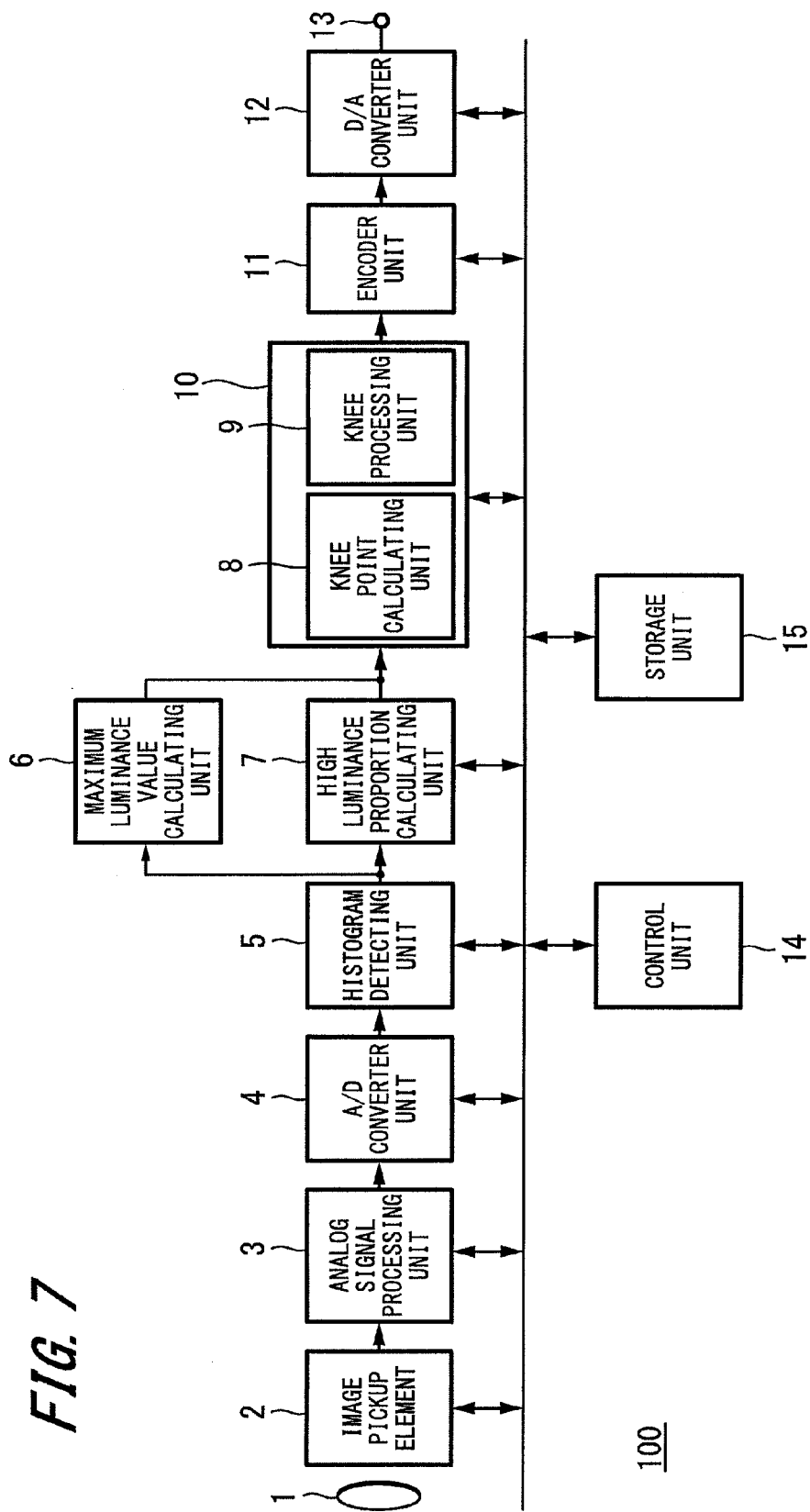
FIG. 7 is a block diagram showing an example of the internal construction of an image pickup apparatus according to an embodiment of the invention.

An embodiment of the invention will now be described with reference to FIGS. 7 to 12. FIG. 7 is a block diagram showing one example of the internal construction of an image pickup apparatus. As shown in FIG. 7, an image pickup apparatus 100 includes a control unit 14 that controls various components constructing the image pickup apparatus 100, and a storage unit 15 that temporarily stores data processed by the control unit 14 and in which data such as programs is also stored. The control unit 14 may be composed of a microcomputer or the like and the storage unit 15 may be composed of a semiconductor memory or the like. The storage unit 15 stores output values and the like from a histogram detecting unit 5, a maximum luminance value calculating unit 6, a high luminance proportion calculating unit 7, and a knee point calculating unit 8, all of which are described later.

The image pickup apparatus 100 also includes a lens 1, an image pickup element 2, an analog signal processing unit 3 and an analog/digital converter unit 4. The lens 1 transmits light from the subject into the image pickup apparatus 100. The image pickup element 2 generates an image signal by carrying out photoelectric conversion on light that is incident on the image pickup element 2 through the lens 1 and outputs the generated image signal. The analog signal processing unit 3 carries out signal processing on the image signal outputted from the image pickup element 2. The analog/digital converter unit 4 (hereinafter simply "A/D converter unit") converts the image signal outputted from the analog signal processing unit 3 to a digital signal.

The image pickup element 2 may be composed of a CCD element or CMOS element, converts light that has been split into the three colors R, G, and B by a color-splitting prism, not shown, to signals corresponding to the amounts of the respective colors and outputs such signals as an image signal. The analog signal processing unit 3 may be composed of a CDS (Correlated Double Sampling) circuit, an AGC (Automatic Gain Control) circuit, and the like, not shown. The CDS circuit carries out processing that removes reset noise included in the inputted image signal, and the AGC circuit carries out processing that amplifies the image signal to adjust the signal to a predetermined level.

The image pickup apparatus 100 also includes the histogram detecting unit 5, the maximum luminance value calculating unit 6, the high luminance proportion calculating unit 7, the knee point calculating unit 8 and the knee processing unit 9. The histogram detecting unit 5 detects the distribution of numbers of pixels in regions set for different luminance levels. The maximum luminance value calculating unit 6 calculates a maximum luminance value PK (peak value) based on a detection result of the histogram detecting unit 5. The high luminance proportion calculating unit 7 measures image signals with luminance values that are equal to a white clip point WP or higher and calculates the proportion of such image signals. The knee point calculating unit 8 calculates the knee point based on output values from the maximum luminance value calculating unit 6 or the high luminance proportion calculating unit 7. The knee processing unit 9 compresses high luminance signals with the knee point calculated by the knee point calculating unit 8 as the start point.

The histogram detecting unit 5 determines to which region out of a predetermined number of regions set in advance by luminance level a luminance level of the inputted image signal corresponds to sort the image signal into a corresponding luminance region and counts the number of pixels assigned to each luminance region. The output values from the histogram detecting unit 5 are stored in the storage unit 15 and are read out by the control unit 14 once every vertical synchronization period.

The maximum luminance value calculating unit 6 checks the histogram (distribution of number of pixels by luminance level) obtained by the histogram detecting unit 5 for the presence of pixels in each region in order starting from the region with the highest luminance level, and on finding a region with a pixel, determines a middle level value of the region in which a pixel has been found as the maximum luminance value PK.

The high luminance proportion calculating unit 7 determines whether the luminance level of the inputted image signal is equal to or higher than the white clip point WP (in this embodiment, 109%) and when the luminance level of the inputted image signal is equal to or higher than the white clip point WP, counts the number of the pixels whose luminance level is equal to or higher than the white clip point WP. When this processing has been carried out for one frame period, the proportion of pixels with high luminance values that are equal to or higher than the white clip point WP to the total number of pixels that compose one frame is calculated. In addition, the counted result is stored in the storage unit 15, and at predetermined timing, the high luminance proportion data for a predetermined number of frames, for example, twelve frames, is read out and the high luminance proportion P (%) for the pixels in the last twelve frames is calculated. Note that although an example where all of the pixels in the last twelve frames are used as the data used to calculate the high luminance proportion P (%) is described in the present embodiment, as other examples, it is also possible to use data of one frame or another multiple number of frames.

The knee point calculating unit 8 calculates the knee point, i.e., the compression start point for high luminance component signals, based on the output value from the maximum luminance value calculating unit 6 and the output value from the high luminance proportion calculating unit 7. In addition to constantly calculating the knee point in accordance with the inputted values, the knee point calculating unit 8 carries out processing that assigns the knee point of a predetermined value when the high luminance proportion P (%) calculated by the high luminance proportion calculating unit 7 is above or below a threshold set in advance. In the present embodiment, the following settings are made in advance. The high luminance proportion of 0% is set as a first threshold Th1, the high luminance proportion of 30% is set as a second threshold Th2, a maximum knee point KMx is set as the knee point assigned when the high luminance proportion P is 0% or above but below the first threshold Th1, and a minimum knee point KMn is set as the knee point assigned when the high luminance proportion P is the second threshold Th2 or higher. In the present embodiment, the maximum knee point KMx is set at 109% and the minimum knee point KMn is set at 70%.

Figure 8:
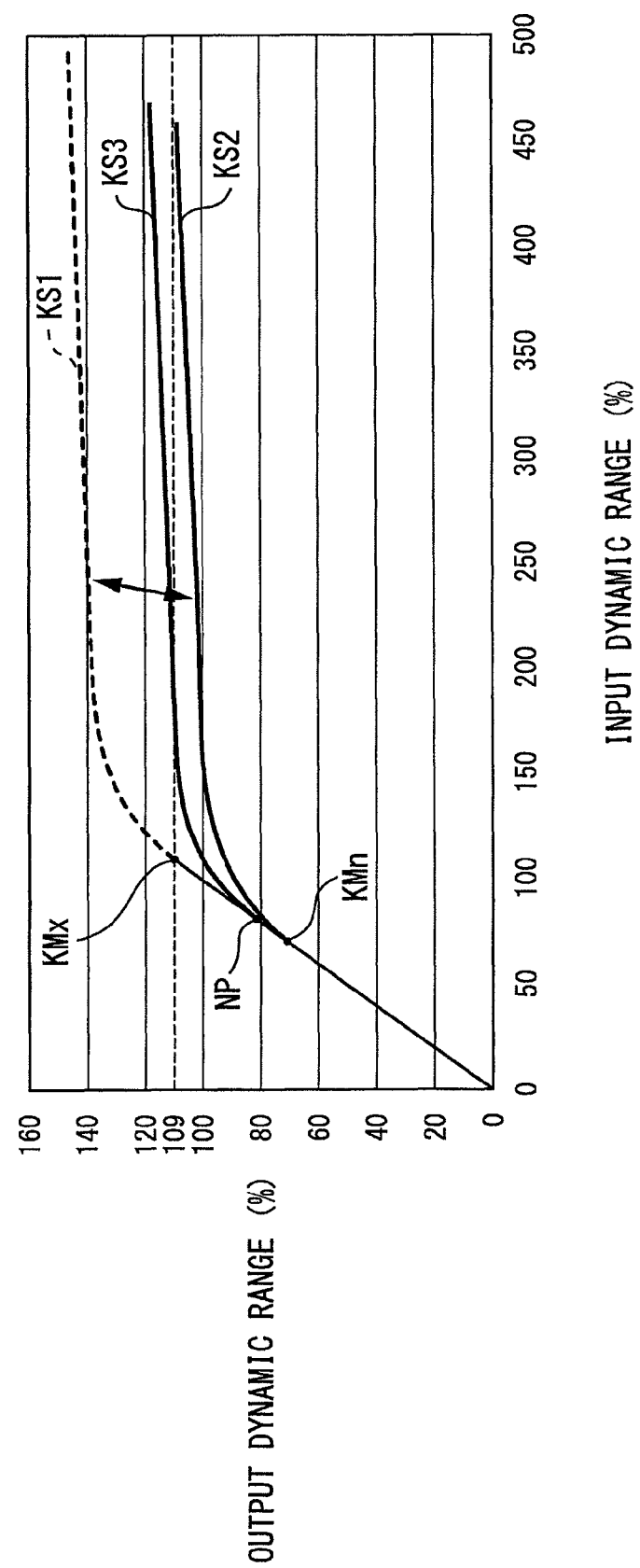
FIG. 8 is a characteristics graph showing the output characteristics of an image signal according to an embodiment of the invention.
Figure 9:
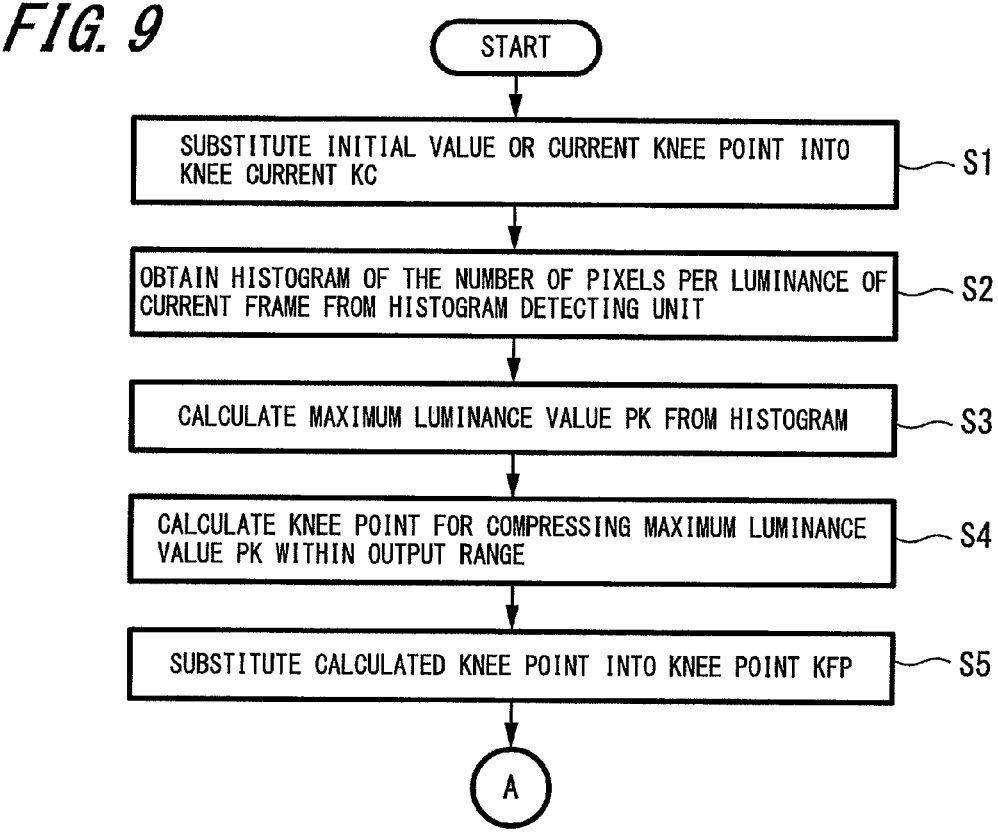
FIG. 9 is a flowchart showing an example of knee point calculating processing based on a maximum luminance value according to an embodiment of the invention.

The knee processing unit 9 carries out processing that generates a knee slope (i.e., compresses the high luminance components) with the knee point calculated by the knee point calculating unit 8 as the start point. In the present embodiment, the inclination of the knee slope is fixed regardless of the position at which the knee point is set, and when the knee point moves, the knee slope also moves in parallel. FIG. 8 shows examples where the knee slope is formed when the knee point is at the minimum knee point KMn, the maximum knee point KMx, and another position. When the maximum knee point KMx has been set as the knee point, a knee slope KS1 that starts at the maximum knee point KMx is formed, while when the minimum knee point KMn has been set as the knee point, a knee slope KS2 that starts at the minimum knee point KMn is formed. Similarly, when another point has been set as the knee point, a knee slope KS3 that starts at the set knee point is formed.

In the present embodiment, the knee slope is expressed by a line broken into six line segments, each of which has a difference slope (i.e., inclination angle). Compared to the slope of the first three line segments counting from the knee point, the slope at the latter three line segments is much more gentle. The slope at the last three line segments that needs to express a gradual slope is set extremely low at around 0.03, for example. The respective slopes of the six line segments are all fixed. That is, the knee processing unit 9 carries out processing that forms the knee slope by applying predetermined inclination values in order starting at the inputted knee point.

Returning to the block diagram in FIG. 7, the knee point calculating unit 8 and the knee processing unit 9 are parts of a signal processing unit 10, with the signal processing unit 10 also carrying out signal processing aside from the processing related to the knee processing. Such processing carried out by the signal processing unit 10 includes gamma correction that corrects the γ levels of the image signal in accordance with a γ curve set in advance, feedback clamp processing that fixes a black level OB (optical black) in the image signal at a predetermined standard level, and white clip processing for adjusting the white balance.

The image pickup apparatus 100 includes an encoder unit 11 that converts the image signal processed by the signal processing unit 10 to a signal of a predetermined format such as NTSC (National Television Standards Committee) or PAL (Phase Alternating Line) format, a digital/analog converter unit 12 (hereinafter referred to as the "D/A converter unit") that converts the image signal outputted from the encoder unit 11 to an analog signal, and an output terminal 13 that outputs the image signal outputted from the digital/analog converter unit 12 to a display unit or recording unit, not shown.

Next, one example of processing that calculates the knee point will be described with reference to the flowcharts in FIGS. 9 to 12. First, in FIG. 9, when processing by the knee point calculating unit 8 is carried out for the first time, such as when the power is turned on, an initial value is substituted into a variable "knee current KC", but if there is a knee point that has already been set when the processing starts, the value of the set knee point is substituted into the variable "knee current KC" (step S1). Here, as one example, a value such as 80% is set as the initial value of the knee point.

After this, the histogram detecting unit 5 is used to obtain a histogram showing the number of pixels by luminance level in the present frame (step S2). Next, the maximum luminance value (i.e., peak value) PK is calculated from the histogram information obtained in step S2 (step S3). After this, the knee point for compressing the maximum luminance value PK within the output dynamic range is calculated based on the maximum luminance value PK (step S4). The calculated knee point is substituted into a variable "knee point KFP" (step S5). As a result of the processing thus far, the knee point calculated based on the maximum luminance value PK is stored in the variable "knee point KFP".

Figure 10:
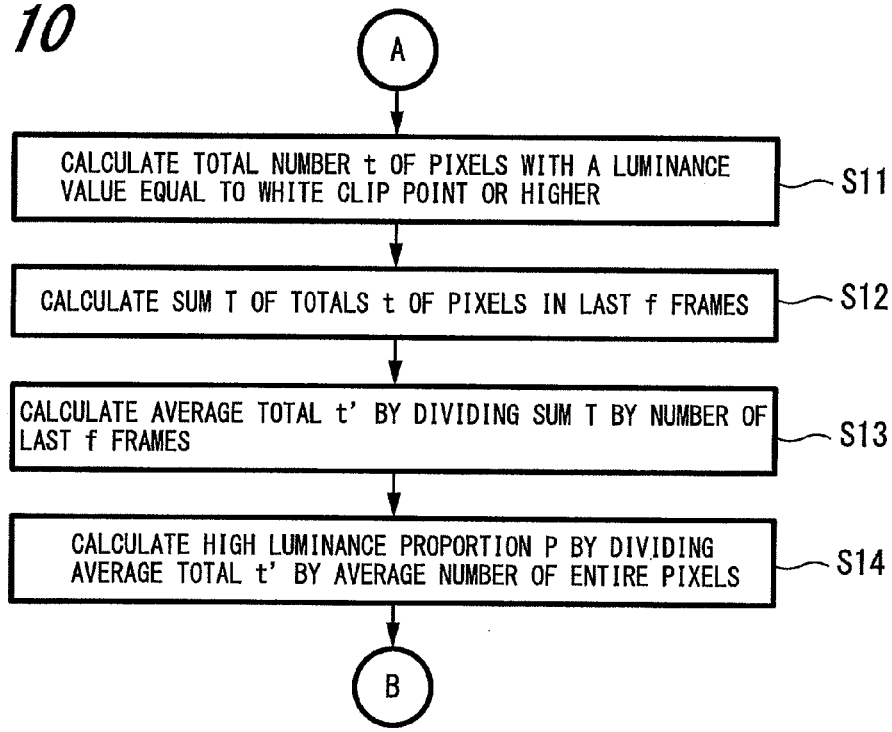
FIG. 10 is a flowchart showing an example of a high luminance proportion calculating process according to an embodiment of the invention.

FIG. 10 is a flowchart showing an example of processing by the high luminance proportion calculating unit 7. In FIG. 10, first the high luminance proportion calculating unit 7 calculates a total t of pixels with luminance values equal to the white clip point WP or higher out of the entire pixels in the present frame and stores the total t in the storage unit 15 (step S11). Next, the totals t of pixels in f frames (twelve frames in the present embodiment) stored in the storage unit 15 are read out and a sum T produced by summing the totals t of pixels in the last f frames is calculated (step S12). After this, the average total t' is calculated by dividing the sum T by the number of f frames (step S13), and finally this average total t' is divided by the average number of entire pixels in the last f frames to calculate a high luminance proportion P (%) for the last f frames (step S14).

Figure 11:
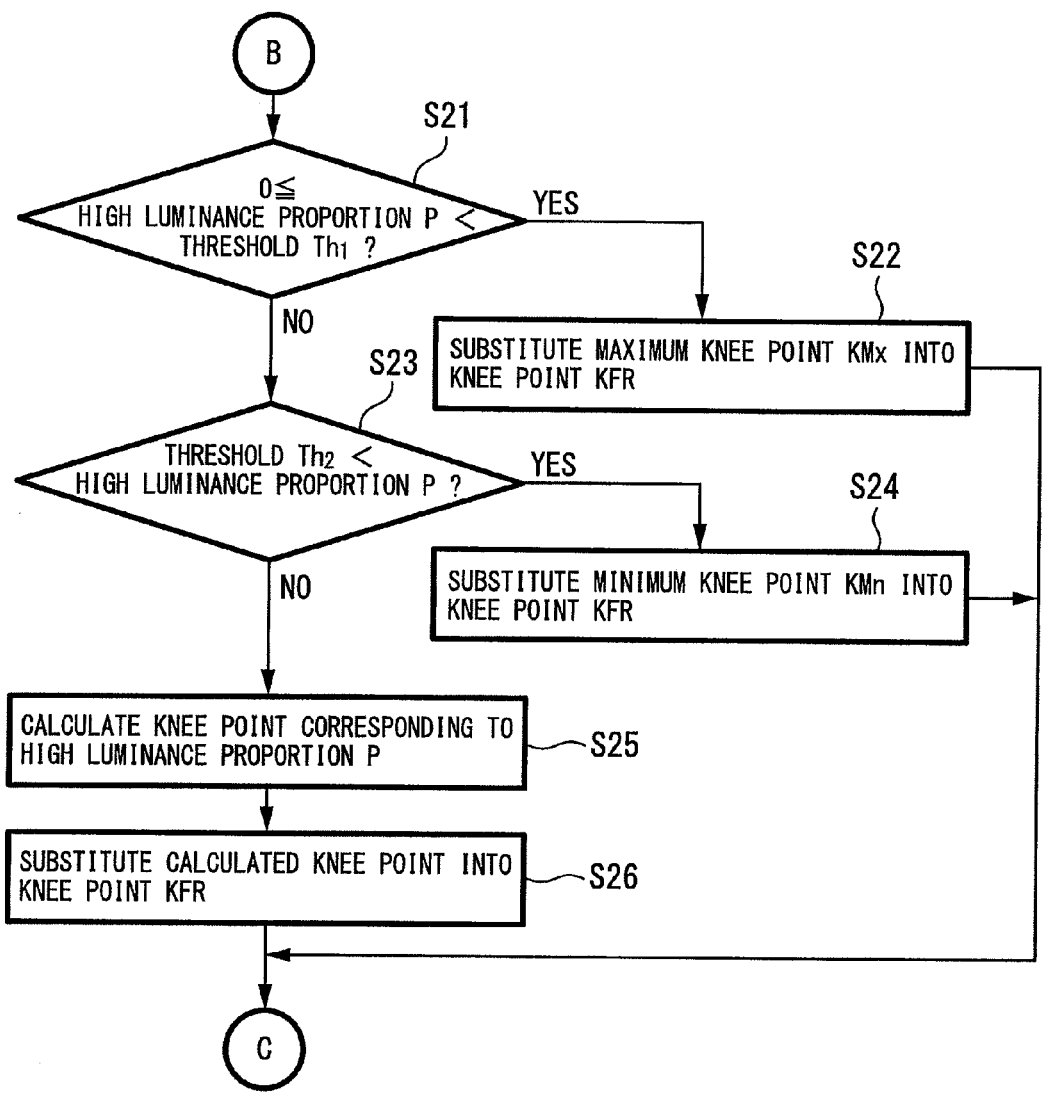
FIG. 11 is a flowchart showing one example of knee point calculation processing based on a histogram according to an embodiment of the invention.

Next, an example of processing by the knee point calculating unit 8 when calculating the knee point based on the calculation results of the high luminance proportion calculating unit 7 described with reference to FIG. 10 will be described with reference to the flowchart in FIG. 11. In FIG. 11, first it is judged whether the high luminance proportion P calculated by the high luminance proportion calculating unit 7 is a value in a range of 0 to the threshold Th1 (step S21). In the present embodiment, since the threshold Th1 is 0%, it is judged whether the high luminance proportion P is 0%. When the high luminance proportion P is 0%, the maximum knee point KMx (in the present embodiment, 109%) is substituted into the variable "knee point KFR" (step S22).

When the condition in step S21 is not satisfied, next it is judged whether the high luminance proportion P is equal to or above the threshold Th2 (step S23). In the present embodiment, since the threshold Th2 is set at 30%, when the high luminance proportion P is equal to or higher than 30%, the minimum knee point KMn (in the present embodiment, 70%) is substituted into the variable "knee point KFR" (step S24).

When the high luminance proportion P is neither higher than 0 but below the threshold Th1 nor equal to or higher than the threshold Th2, that is, when the high luminance proportion P is equal to or higher than the threshold Th1 but below the threshold Th2, the knee point is calculated in accordance with the value of the high luminance proportion P (step S25), and the calculated knee point is substituted into the variable "knee point KFR" (step S26). That is, when hardly any pixels with a predetermined high luminance level or higher are present among all of the pixels that compose the last f frames (in the present embodiment, when such pixels are not present), the values of the maximum knee point KMx is set as the value of the variable "knee point KFR", but when the proportion of such pixels with a predetermined high luminance level is high (in the present embodiment, 30% or higher), the value of the minimum knee point KMn is set as the value of the variable "knee point KFR". Also, when the high luminance proportion P is equal to or higher than the threshold Th1 but below the threshold Th2, the value of a knee point calculated in accordance with such high luminance proportion P is set as the value of the variable "knee point KFR".

Next, an example of processing where the knee point calculating unit 8 decides the final knee point KT based on one of the values substituted into the variables "knee point KFR" and "knee point KFP" and the knee processing unit 9 moves the present knee point KC to the position of the calculated final knee point KT will be described with reference to the flowchart in FIG. 12.

Figure 12:
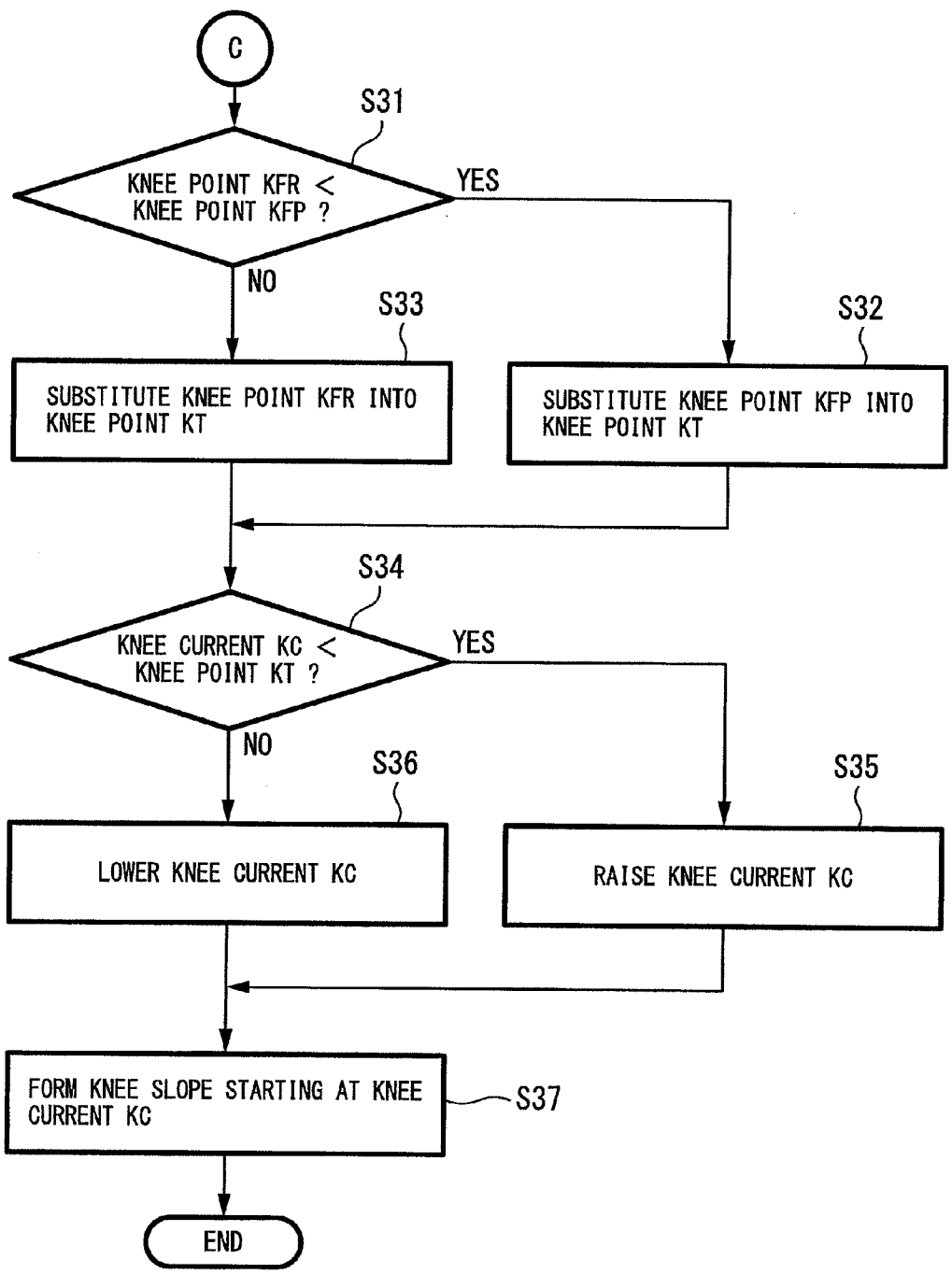
FIG. 12 is a flowchart showing one example of knee point calculation processing according to an embodiment of the invention.

In FIG. 12, first it is determined whether the value substituted into the variable "knee point KFP" is higher than the value set in the variable "knee point KFR" (step S31). When the value of the knee point KFP is higher than the knee point KFR, the value of the knee point KFP is substituted into the knee point KT (step S32). Conversely, when the value of the knee point KFR is equal to or higher than the knee point KFP, the value of the knee point KFR is substituted into the final knee point TK (step S33). That is, the larger value out of the knee point KFP calculated based on the maximum luminance value PK and the knee point KFR calculated based on a histogram of the luminance distribution is used as the final knee point KT.

Next, in the knee processing unit 9, it is determined whether the value of the knee current KC that is the current value of the knee point is lower than the final knee point KT found in step S32 or step S33 (step S34). When the value of the knee current KC is lower, processing that increases the value of the knee current KC based on a knee point raising rate which is set in advance is carried out (step S35). On the other hand, when the value of the knee current KC is higher than the value of the final knee point KT, processing that decreases the value of the knee current KC based on a knee point lowering rate which is set in advance is carried out (step S36). After this, the knee slope is formed starting at the knee current KC (=the final knee point KT) (step S37).

In this way, since a construction is used where the knee point is calculated using a luminance distribution provided by a detected histogram in addition to a maximum luminance value (i.e., peak value), it is possible to avoid setting the knee point lower than is necessary when the proportion of the image occupied by a high luminance subject is low. By doing so, it is possible to avoid bright-area-gradation deterioration and a fall in the gradation in displayed images.

Also, since a construction is used where the inclination of the knee slope is not changed and only the knee point is changed in accordance with the luminance value of the subject and the distribution of luminance, there is no sudden change in the rate at which gradation changes, and therefore it is possible to suppress the production of false outlines.

In the broken line with a predetermined number of line segments that composes the knee slope, since the slope of the broken line near the white clip point is extremely low at around 0.03, for example, it is possible to compress input values with luminances equal to or above the white clip point within the output dynamic range without changing the inclination of the knee slope or lowering the knee point more than necessary.

Note that although the value of the threshold Th1 is 0%, the value of the threshold Th2 is 30%, the value of the minimum knee point KMn is 70%, and the value of the maximum knee point Kmx is 109% in the embodiment described above, such values are mere examples and arbitrary values can be set instead.

Also, although an example where the invention is applied to an image pickup apparatus has been described in the above embodiment, the invention can also be applied to a recording/playback apparatus or image signal processing apparatus that records or plays back an input signal from a video camera and image pickup apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   a histogram detecting unit that detects a distribution of numbers of pixels by luminance level of a picked-up image signal;
   a maximum luminance value calculating unit that calculates a maximum luminance value of the picked-up image signal;
   a high luminance proportion calculating unit that calculates a proportion of a high luminance signal out of all of the pixels composing one or a plurality of frames based on the distribution of numbers of pixels by luminance level detected by the histogram detecting unit;
   a knee point calculating unit that calculates a knee point based on the maximum luminance value calculated by the maximum luminance value calculating unit and the proportion of the high luminance signal calculated by the high luminance proportion calculating unit; and
   a knee processing unit that generates a knee slope with a predetermined inclination starting at the knee point calculated by the knee point calculating unit,
   wherein the knee processing unit does not change the predetermined inclination, regardless of the value of the knee point calculated by the knee point calculating unit.

2. The image pickup apparatus according to claim 1,
   wherein the knee point calculating unit is provided with a first threshold and a second threshold and is configured to set a maximum value set in advance as the knee point when the proportion of the high luminance signal calculated by the high luminance proportion calculating unit is below the first threshold, to set a minimum value set in advance as the knee point when the proportion of the high luminance signal is equal to or higher than the second threshold, and to calculate a value of the knee point in accordance with the proportion of the high luminance signal when the proportion of the high luminance signal is equal to or higher than the first threshold but lower than the second threshold.

3. The image pickup apparatus according to claim 2,
   wherein the maximum value is a maximum value in an output dynamic range of the picked-up image signal.

4. The image pickup apparatus according to claim 1,
   wherein the maximum luminance value calculating unit calculates the maximum luminance value based on the distribution of numbers of pixels by luminance level detected by the histogram detecting unit.

5. An image signal processing apparatus comprising:
   a histogram detecting unit that detects a distribution of numbers of pixels by luminance level of an inputted image signal;
   a maximum luminance value calculating unit that calculates a maximum luminance value of the inputted image signal;
   a high luminance proportion calculating unit that calculates a proportion of a high luminance signal out of all of the pixels composing one or a plurality of frames based on the distribution of numbers of pixels by luminance level detected by the histogram detecting unit;
   a knee point calculating unit that calculates a knee point based on the maximum luminance value calculated by the maximum luminance value calculating unit and the proportion of the high luminance signal calculated by the high luminance proportion calculating unit; and
   a knee processing unit that generates a knee slope with a predetermined inclination starting at the knee point calculated by the knee point calculating unit,
   wherein the knee processing unit does not change the predetermined inclination, regardless of the value of the knee point calculated by the knee point calculating unit.

6. An image signal processing method, comprising the steps of:
   detecting a distribution of numbers of pixels per luminance for an input image signal;
   calculating a maximum luminance value of the input image signal;
   calculating a proportion of a high luminance signal out of all of the pixels composing one or a plurality of frames based on the detected distribution of numbers of pixels by luminance level;
   calculating a knee point based on the calculated maximum luminance value and proportion of the high luminance signal; and
   generating a knee slope with a predetermined inclination starting from the calculated knee point,
   wherein the predetermined inclination does not change, regardless of the value of the calculated knee point.

* * * * *